(12) United States Patent
Brodie et al.

(10) Patent No.: US 7,167,998 B2
(45) Date of Patent: Jan. 23, 2007

(54) PROBLEM DETERMINATION USING PROBING

(75) Inventors: Mark A. Brodie, Briarcliff, NY (US); Sheng Ma, Briarcliff Manor, NY (US); Irina Rish, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 10/676,244

(22) Filed: Sep. 30, 2003

(65) Prior Publication Data

US 2005/0081082 A1 Apr. 14, 2005

(51) Int. Cl.
*G06F 11/00* (2006.01)

(52) U.S. Cl. .......................................... 714/4

(58) Field of Classification Search ............... 714/4, 714/8, 27, 43, 37; 709/224, 226
See application file for complete search history.

(56) References Cited

U.S. PATENT DOCUMENTS

| 4,680,581 | A | * | 7/1987 | Kozlik et al. ............... 340/3.44 |
| 5,633,857 | A | * | 5/1997 | Kim et al. ................... 370/242 |
| 5,636,203 | A | * | 6/1997 | Shah .......................... 370/244 |
| 6,038,390 | A | * | 3/2000 | Sofman ....................... 703/13 |
| 6,457,143 | B1 | * | 9/2002 | Yue ............................ 714/43 |
| 6,845,123 | B1 | * | 1/2005 | Nyberg et al. .............. 375/133 |
| 7,020,701 | B1 | * | 3/2006 | Gelvin et al. ............... 709/224 |
| 2004/0228279 | A1 | * | 11/2004 | Midtun et al. .............. 370/236 |

* cited by examiner

Primary Examiner—Nadeem Iqbal
(74) Attorney, Agent, or Firm—Ference & Associates (57) ABSTRACT

The deployment of probing technology for the purpose of problem determination in a server or network element is disclosed. One can actively select which probes to send in order to be able to diagnose problems which one is particularly interested in, allowing for greater flexibility and efficiency. The extra load imposed on a network by the use of probes is small, especially if the algorithms described in this disclosure are used.

19 Claims, 13 Drawing Sheets

INITIAL DEPENDENCY MATRIX

AN EXAMPLE OF THE INITIAL DEPENDENCY MATRIX $N_1$ AND $N_4$ ARE PROBE-STATIONS – THERE IS ONE PROBE FROM EACH PROBE-STATION TO EACH NODE, FOLLOWING SHORTEST PATH ROUTING.

DEPENDENCY MATRIX (rxn)

|  | $N_1$ | $N_2$ | $N_3$ | $N_4$ | $N_5$ | $N_6$ | NF |
|---|---|---|---|---|---|---|---|
| $P_{12}$ | 1 | 1 | 0 | 0 | 0 | 0 | 0 |
| $P_{13}$ | 1 | 0 | 1 | 0 | 0 | 0 | 0 |
| $P_{14}$ | 1 | 0 | 1 | 1 | 0 | 0 | 0 |
| $P_{15}$ | 1 | 1 | 0 | 0 | 1 | 0 | 0 |
| $P_{16}$ | 1 | 0 | 1 | 0 | 0 | 1 | 0 |
| $P_{42}$ | 0 | 1 | 1 | 1 | 0 | 0 | 0 |
| $P_{43}$ | 0 | 0 | 1 | 1 | 0 | 0 | 0 |
| $P_{45}$ | 0 | 1 | 1 | 1 | 1 | 0 | 0 |
| $P_{46}$ | 0 | 0 | 1 | 1 | 0 | 1 | 0 |

EXAMPLE
AN EXAMPLE OF COMPUTING THE DIAGNOSABLE
PROBLEMS OF A GIVEN PROBE SET (0) $S_0 = \{\{N_1, N_2, N_3, N_4, N_5, N_6, NF\}\}$ (1)        $N_1$   $N_2$   $N_3$   $N_4$   $N_5$   $N_6$   NF
    $P_{15}$   1   1   0   0   1   0   0

PROBLEM DETERMINATION USING PROBING

FIELD OF THE INVENTION

This invention generally relates to problem determination in a server or network element and, more specifically, to the deployment of probing technology for the purpose of problem determination.

BACKGROUND OF THE INVENTION

A list of references is set forth at the close of the present disclosure; individual references from the list are referred to herebelow numerically (i.e., [1], [2], [3], etc . . . ).

As networks continue to grow in size and complexity, system administrators are faced with an ever-increasing volume of event data, and tasks such as fault localization and problem determination become more difficult. As a result, tools are needed that can assist in performing these management tasks by responding quickly and accurately to the large number of events and alarms that are usually generated by even a single fault. Currently this task is usually done using event correlation techniques that utilize network dependency models to integrate the information provided by multiple alarms in order to determine the most likely cause of the problem. [3,4,5,6]

Probing technology is widely used to measure the quality of network performance, often motivated by the requirements of service-level-agreements. A probe is a program that executes on a particular machine (called a probing station) by sending a command or transaction to a server or network element and measuring the response (See FIG. 1). Examples of probing technology include the T.J. Watson EPP technology [1] and the Keynote product [2]. Probing offers the opportunity to develop an approach to problem determination that is more active than traditional event correlation and other methods.

Several decisions are needed to use probes in practice. First, probing stations must be selected at one or more locations in the network. Second, the probes must be configured—it must be decided which network elements to target and which station each probe should originate from. Configuring a probe set in order to perform fault localization requires certain trade offs; the objective is to obtain a probe set which is both small, thereby minimizing network load and the costs of storing the probe results, yet also provides wide coverage, in order to locate problems anywhere in the network.

SUMMARY OF THE INVENTION

In accordance with at least one presently preferred embodiment of the present invention, there is broadly contemplated a system and method of using probing technology for the purpose of problem determination. Probes to be sent may be actively selected in order to be able to diagnose problems of particular interest, which allows for greater flexibility and efficiency. The extra load imposed on a network by the use of probes is small and may be minimized through the selection of the algorithms to be used.

In summary, one aspect of the invention provides an apparatus for diagnosing problems in multiple node networks using probing technology, the apparatus comprising: an arrangement for determining a candidate probe set; an arrangement for determining which problems can be diagnosed by the candidate probe set; and an arrangement for finding small probe sets which can diagnose the same problems as the candidate probe set.

Another aspect of the present invention provides a method for diagnosing problems in multiple node networks using probing technology, the method comprising the steps of: determining a candidate probe set; determining which problems can be diagnosed by the candidate probe set; and finding small probe sets which can diagnose the same problems as the candidate probe set.

Furthermore, an additional aspect of the invention provides a program storage device readable by machine, tangibly embodying a program of instructions executable by the machine to perform method steps for diagnosing problems in multiple node networks using probing technology, said method comprising the steps of: determining a candidate probe set; determining which problems can be diagnosed by the candidate probe set; and finding small probe sets which can diagnose the same problems as the candidate probe set.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

The present invention employs a novel approach for fault localization and problem determination in networks. The approach utilizes an active probing technology, rather than traditional approaches which correlate alarm events received from multiple sources when a failure occurs. The problem is precisely formulated, a system architecture for addressing the problem in a modular way is described, and algorithms for finding small probe sets that are able to diagnose problems occurring anywhere in the network are implemented.

The problem is formulated in terms of a dependency matrix methodology that captures the interactions between the paths which the probes traverse. The first step is to compute the initial dependency matrix using information about which probe-stations and probes are available to be used. The second step is to determine using the dependency matrix which problems can be diagnosed using the complete set of probes. The third step is to find smaller probe sets which are able to diagnose the same set of problems as the initial probe set. Small probe sets are desirable to minimize the additional network load and data storage costs imposed by the use of probes.

Three preferred algorithms are provided for computing small probe sets. An exhaustive search algorithm will find the smallest possible probe set able to diagnose the full set of problems, but this is computationally expensive. A linear-time algorithm is provided which very quickly finds a small (but not necessarily minimal size) probe set. A quadratic-time algorithm is provided which finds a smaller (but still not necessarily minimal size) probe set. A system architecture is provided which facilitates the decision of which algorithm to use depending on the desired tradeoff between computational cost and probe set size.

Figure 1:
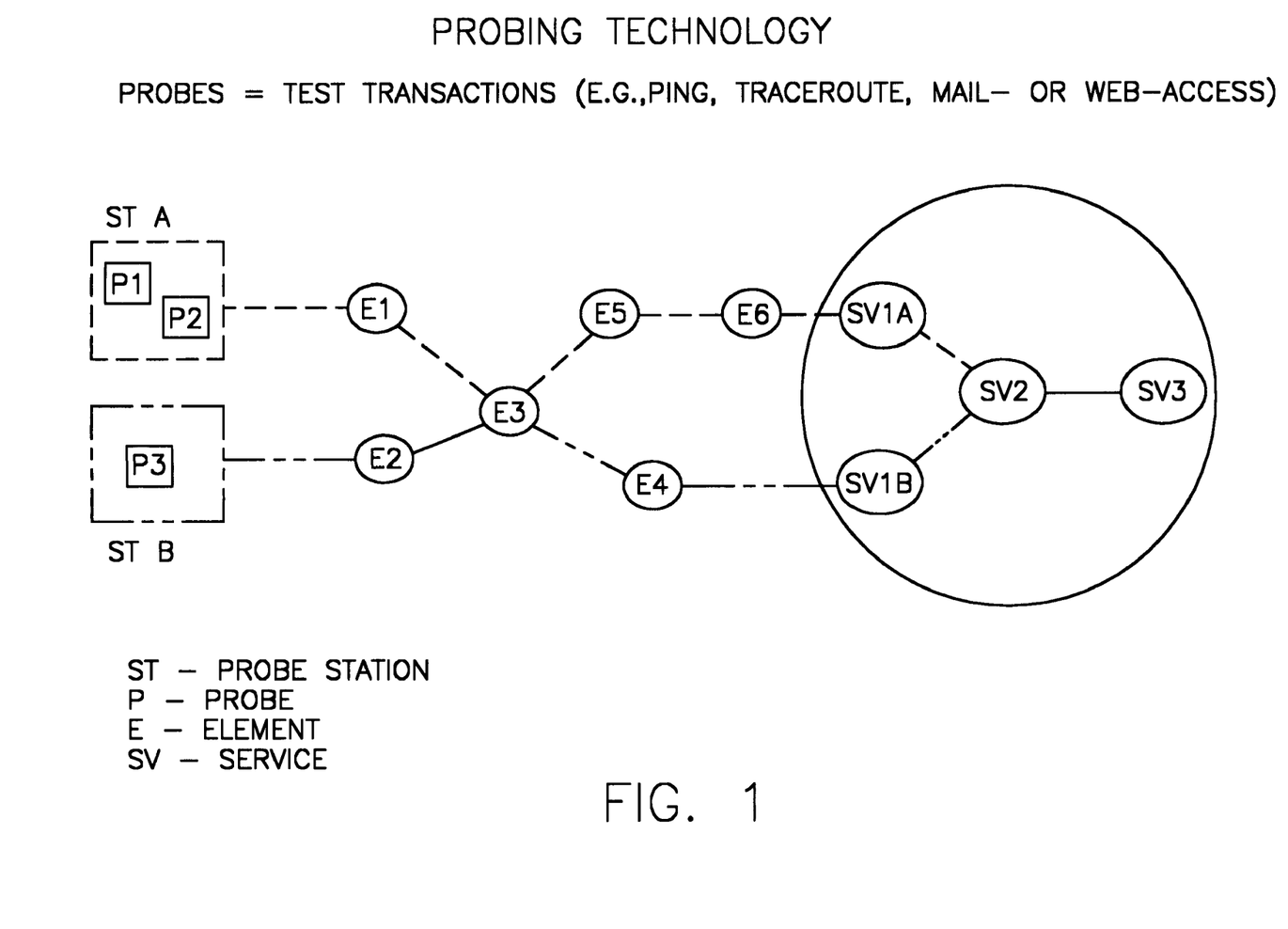
FIG. 1 illustrates probing technology.

FIG. 1 illustrates how probing technology works. It is important to note that the network model is quite general. For example, layering can be accommodated: if a web-server depends on TCP/IP running which depends on the box being up, this can be modeled as a node for the box with a link to TCP/IP from the box and a further link from TCP/IP to the web-server. Thus nodes may represent applications and links dependencies between those applications. Similarly, a node may represent a sub-network of many nodes whose inter-connections are unknown. In this case probing will determine that the problem lies somewhere in that sub-network, at which point some form of local system management (perhaps including local probing) may be used to pinpoint the problem.

Finding the minimal set of probes needed for fault localization requires providing answers to the following questions: (1) Which probes are available as "candidates" for use in a network? (2) Which faults can be successfully identified by a given set of probes? (3) What is the smallest number of probes that can identify the same collection of faults as a given set? The present invention addresses these issues and integrates the solutions obtained into a system for performing fault localization.

Suppose the network has n nodes. Each probe is represented as a binary string of length n, where a 1 in position j denotes that the probe passes through node $N_j$. Each probe that is sent out either returns successfully or fails to do so. If a probe is successful, then every node and link along its path must be up. Conversely, if a node or link is down then any probe passing through that node or link fails to return.

Figure 2:
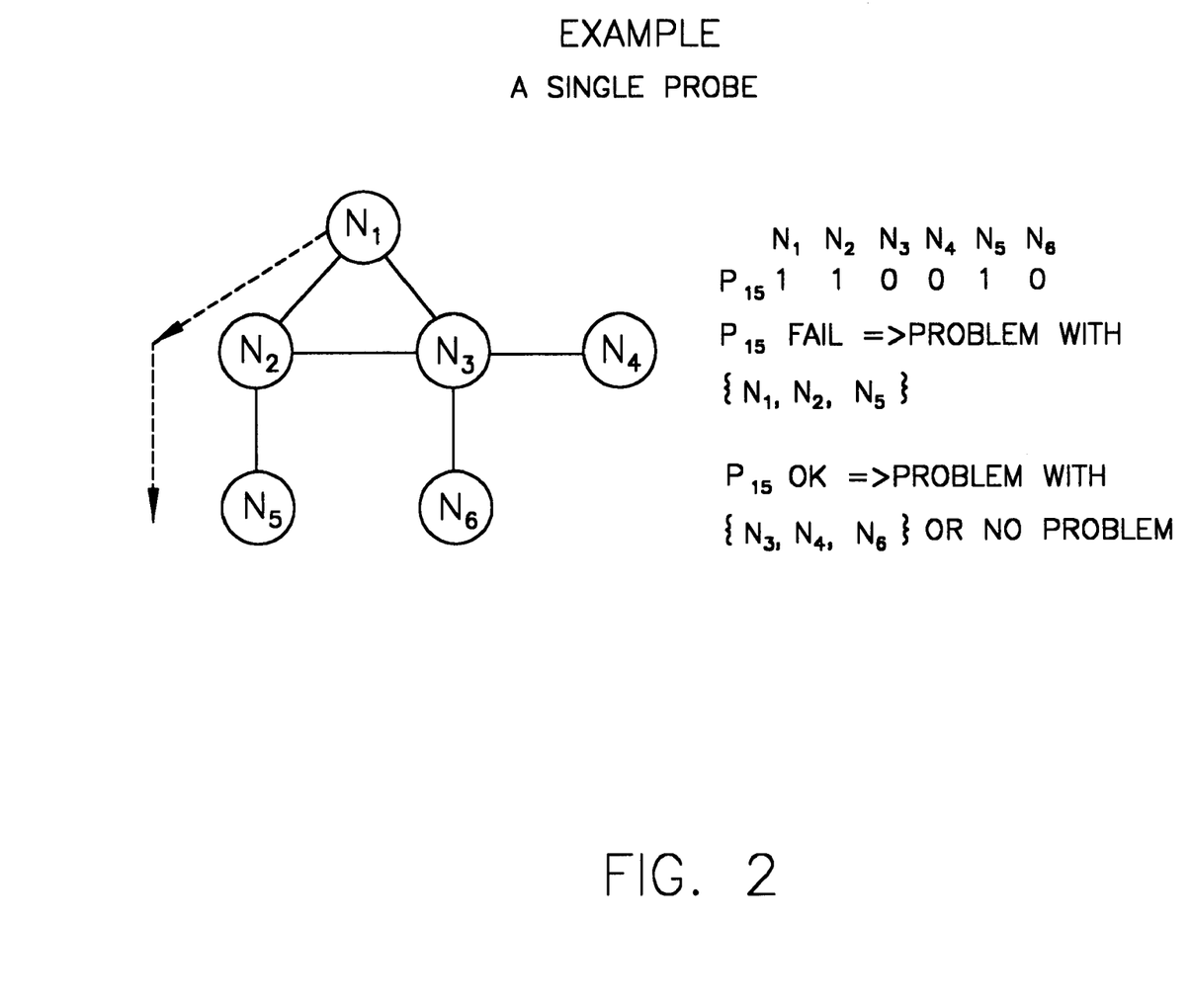
FIG. 2 shows an example of a probe going through a network.

FIG. 2 shows a probe going from $N_1$ through $N_2$ to $N_5$. If this probe (denoted by $P_{15}$, indicating the starting and ending nodes) fails, that indicates a problem with either $N_1$, $N_2$, or $N_5$. If $P_{15}$ succeeds, that indicates that $N_1$, $N_2$, and $N_5$ are all ok, although there may be a problem with one of the other nodes that the probe does not pass through.

A set of r probes defines a dependency matrix D, where $D(i,j)=1$ if probe $P_i$ passes through node $N_j$ and $D(i,j)=0$ otherwise. D is an r-by-n matrix, where r is the number of probes and n the number of nodes.

Figure 3:
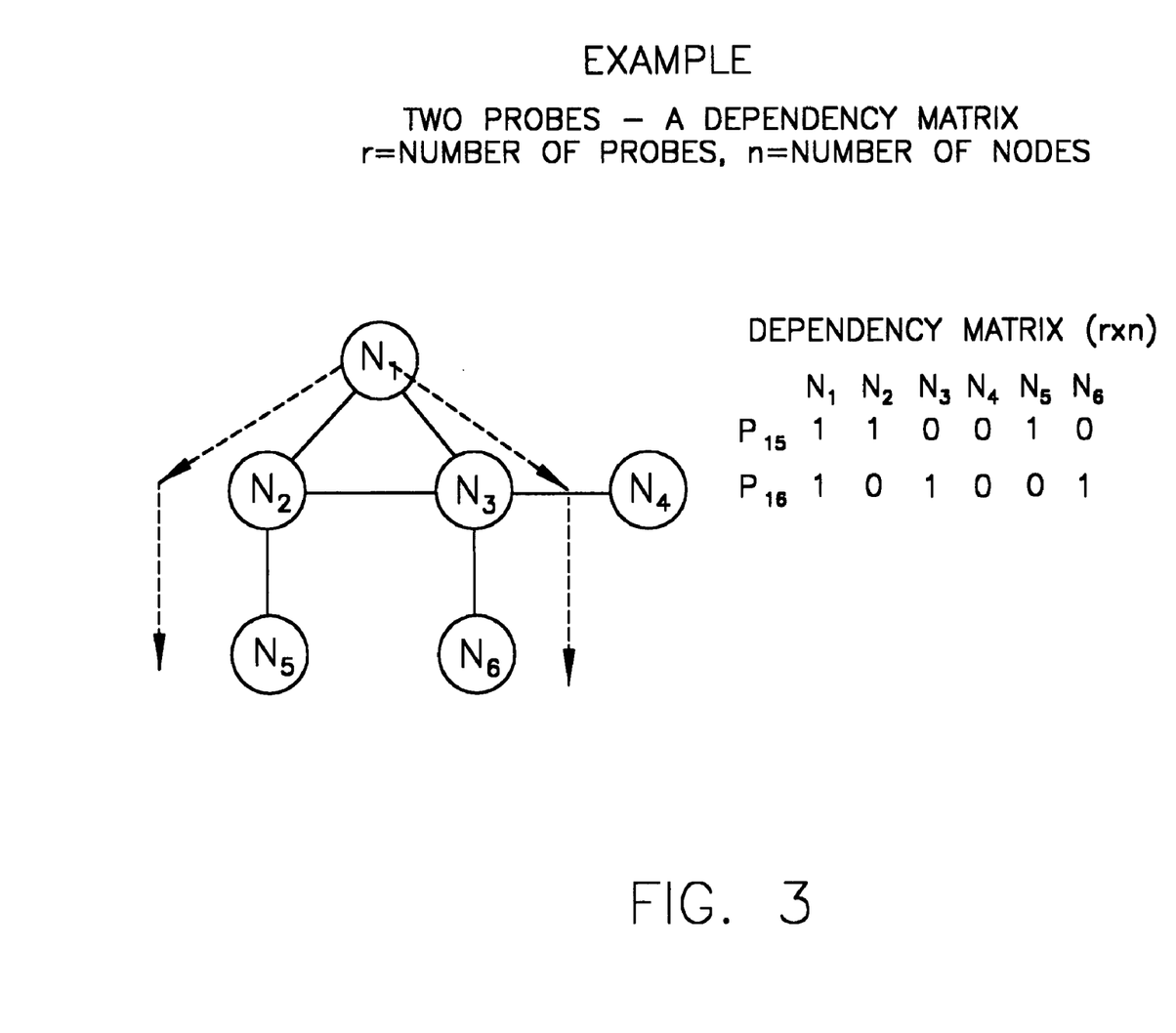
FIG. 3 shows an example of two probes and the resulting dependency matrix.

FIG. 3 shows an example of 2 probes and the resulting dependency matrix.

If r probes are sent out, their results provide a "signal"—a binary string of length r, each digit denoting whether or not that probe returned successfully. For example, in FIG. 3 if only $N_2$ is down then $P_{15}$ fails but $P_{16}$ succeeds. Similarly if only $N_5$ is down then $P_{15}$ fails but $P_{16}$ succeeds. Thus these two failures result in the same signal, because their columns in the dependency matrix are identical; i.e. a failure in $N_2$ cannot be distinguished, by these 2 probes, from a failure in $N_5$. Any problem whose column in the dependency matrix is unique generates a unique signal and as a result can be unambiguously diagnosed.

Figure 4:
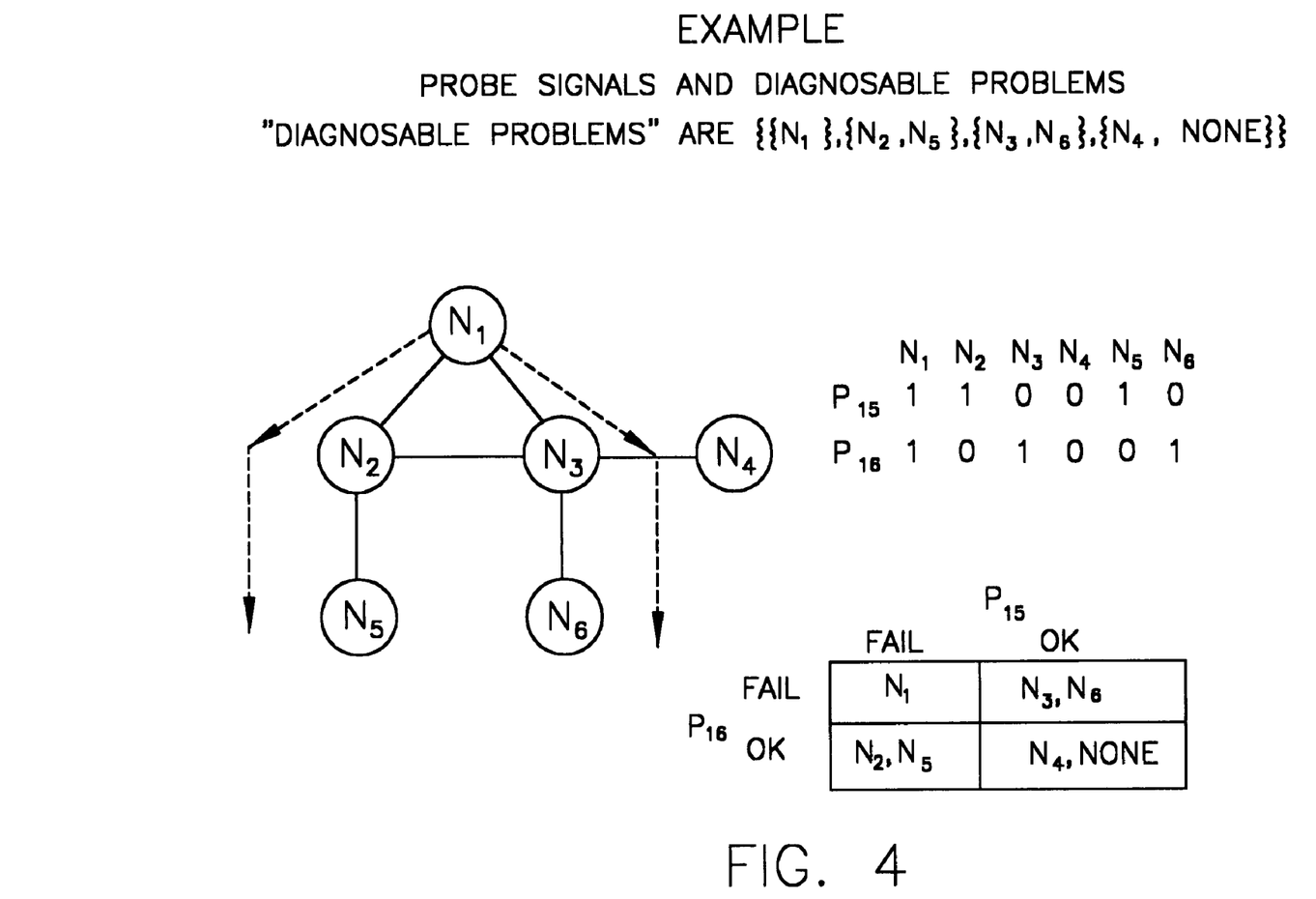
FIG. 4 shows the various problem diagnoses that can result from sending out the two probes.

FIG. 4 shows the 4 possible signals that might result from sending out these 2 probes, and which problems might be the cause of each signal.

A failure in node $N_1$ can be uniquely diagnosed, because both probes fail and no other single node failure results in the same signal; $N_1$'s column in the dependency matrix is unique. However, as explained above, a failure in $N_2$ cannot be distinguished from a failure in $N_5$, and similarly a failure in $N_3$ cannot be distinguished from a failure in $N_6$. Although $N_4$'s column is unique, a failure in $N_4$ cannot be distinguished from no failure anywhere in the network, because there is no probe passing through $N_4$. Adding an extra "node" whose column is all zeroes, representing no failure, avoids this technicality. Any problem whose column in the dependency matrix is unique generates a unique signal and as a result can be unambiguously diagnosed.

Thus a dependency matrix decomposes the network into a disjoint collection of nodes, where each group consists of the nodes whose columns are identical; i.e., each group contains those nodes whose failure cannot be distinguished from one another by the given set of probes. This defines the diagnosable problems of a set of probes. For example, in FIG. 4 the diagnostic problems are {{1}, {2,5}, {3,6}, {4,NF}}, where index j represents node $N_j$ and NF is the extra "node" representing no failure anywhere in the network. A failure is diagnosable if and only if its group is a singleton set.

Figure 5:
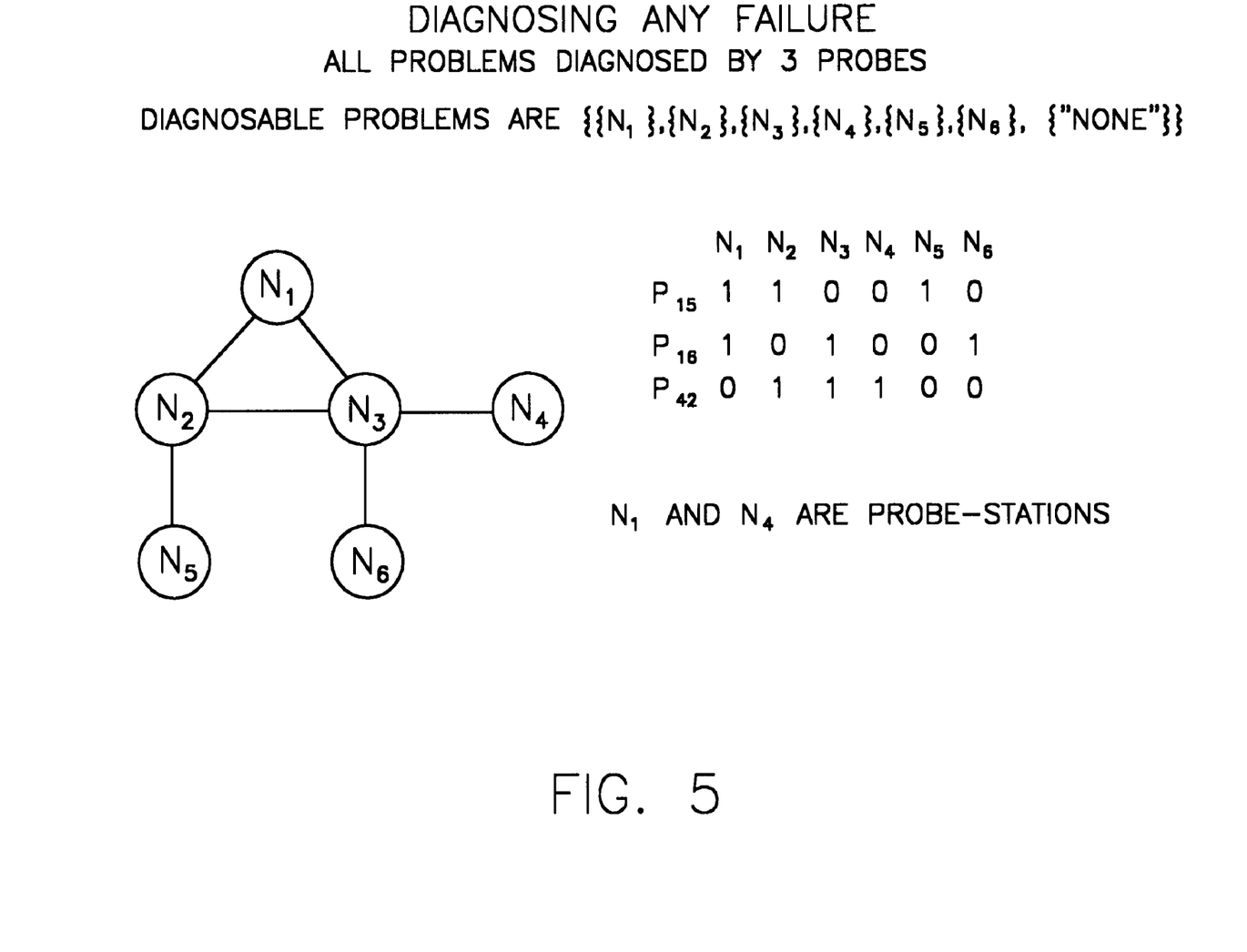
FIG. 5 shows an example where a third probe has been added to the previous two.

FIG. 5 shows an example where a third probe has been added to the previous 2. This third probe, $P_{42}$, goes from $N_4$ through $N_3$ to $N_2$. Note that these 3 probes are enough to diagnose a failure in any of the 6 nodes, because each column in the dependency matrix is unique.

Figure 6:
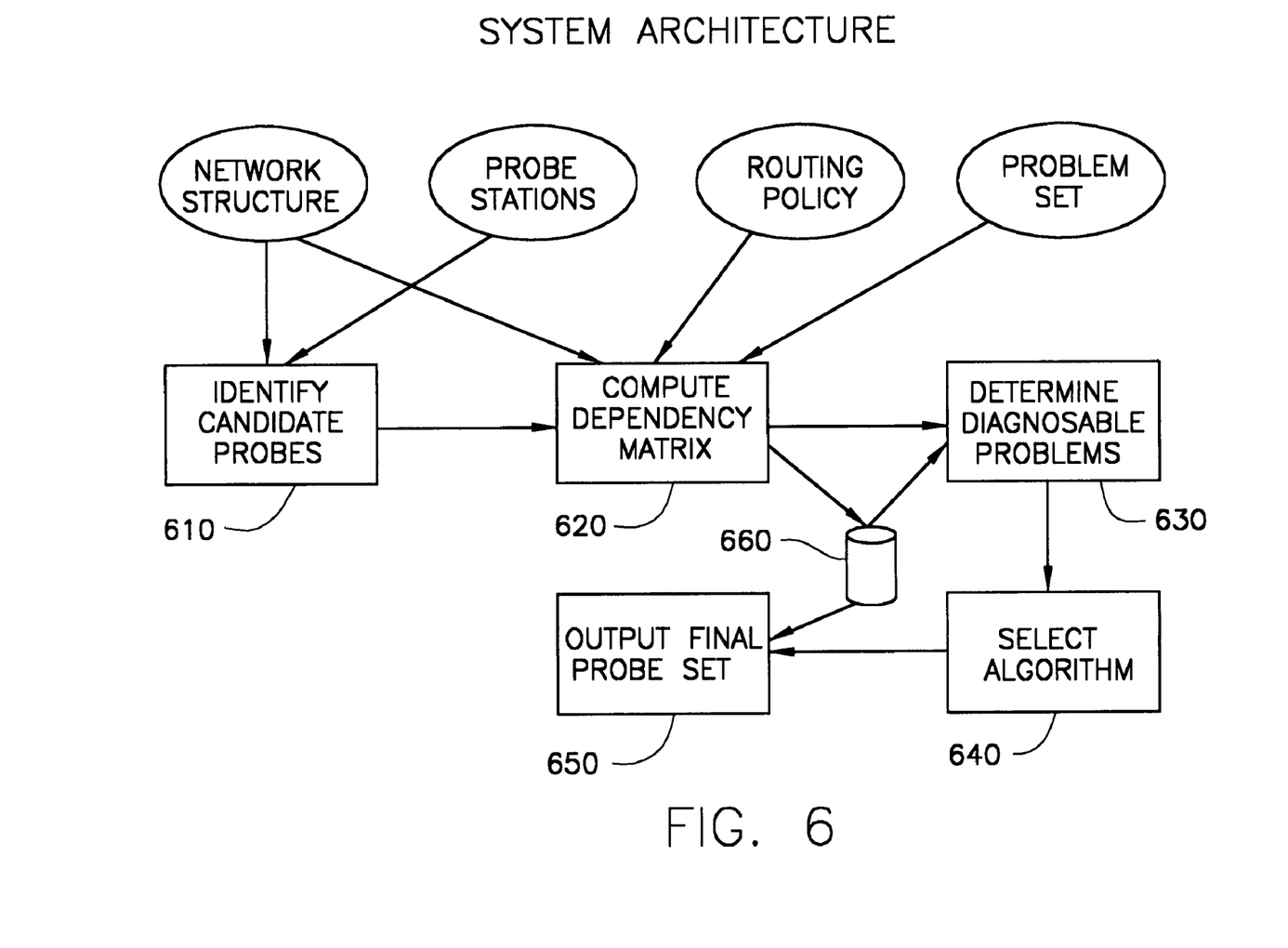
FIG. 6 illustrates the system architecture.

FIG. 6 illustrates the system architecture. First the candidate probes are identified, 610, and the dependency matrix and its diagnosable problems are determined, 620. Then a subset of the candidate probes is found which has the same diagnosable problems as the entire set. To do this first the diagnosable problems are found, 630. Various algorithms are available for computing the final probe set, depending on whether the user wants the guaranteed minimal set of probes or if a small but non-minimal set is adequate. The user selects the algorithm, 640, and the final set of probes is then output, 650. The dependency matrix can be stored in a database as an intermediate step, 660, so that later computations can make use of it without having to repeat earlier computations.

Determining the Initial Dependency Matrix

The architecture described above allows the set of candidate probes to be provided from whatever sources are available; for example a human expert may specify which probes are possible. It may also be useful, however, to compute the available probes from the network structure and the location of the probe stations. This provides a specific instantiation of step 610.

From the n nodes a subset of k nodes are selected as the probe stations. Potentially any node may be a probe station, but in practice only a small number are used; they are usually chosen based on extraneous considerations, such as controlled access to the machines. A probe can be sent to any node from any probe station. Thus the candidate set of probes could theoretically contain a probe for every possible route between every probe station and every node. In practice it cannot be guaranteed that a probe follows a particular path through the network, and thus routing strategies restrict the set of available probes; for example a probe may follow the shortest (i.e., least-cost) path through the network. This creates a candidate set of probes whose size r is a linear function of the number of nodes n; this set is sufficient to diagnose any single node being down because one can simply use one probe station and send a probe to every node.

Figure 7:
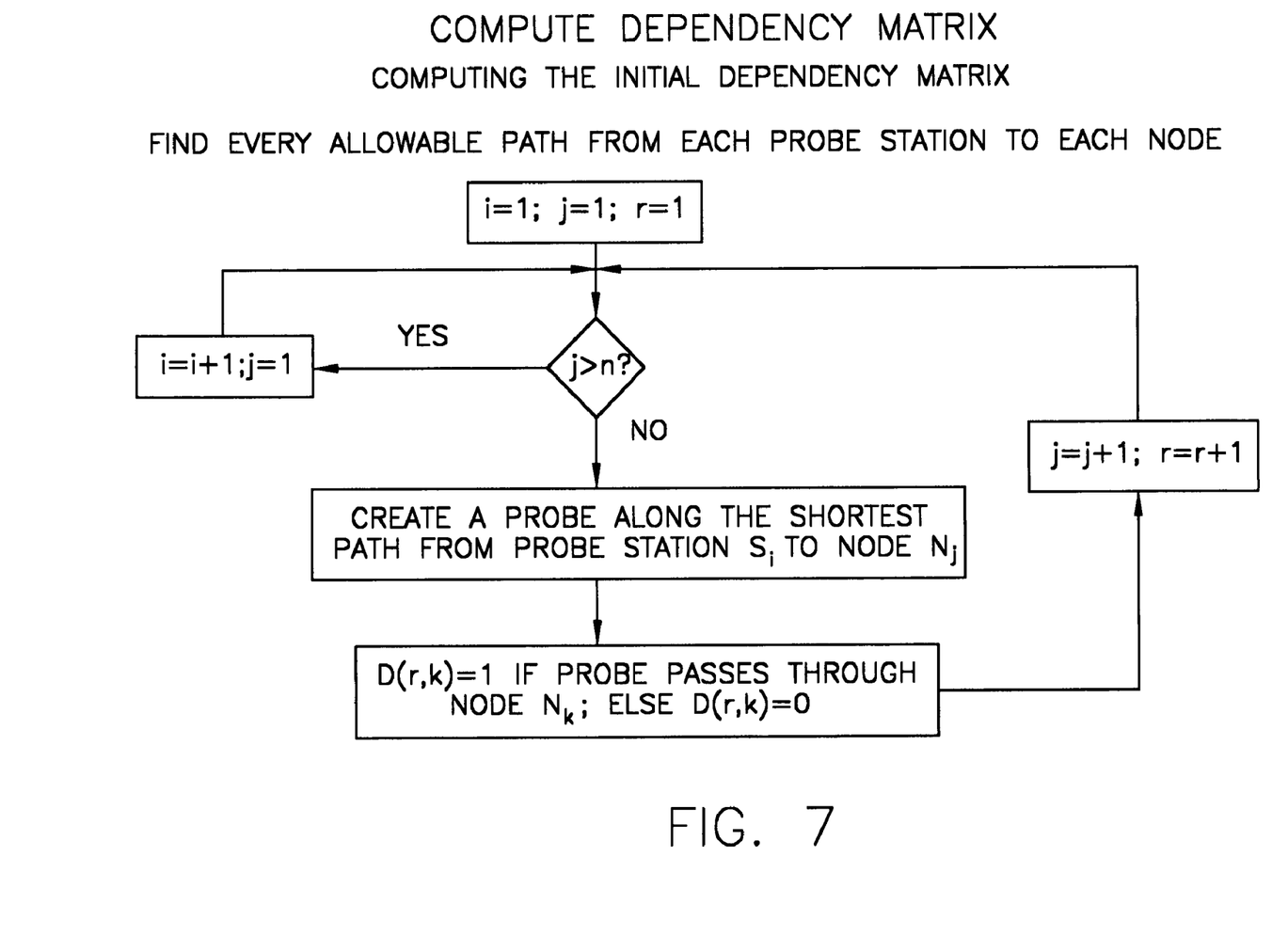
FIG. 7 describes the algorithm for computing the initial dependency matrix.

FIG. 7 describes the algorithm for computing the initial dependency matrix. For each probe-station $S_i$ and each node $N_j$, a row of the dependency matrix corresponds to the shortest path through the network from $S_i$ to $N_j$; each value in this row is set to either 1 or 0 depending on whether or not the path passes through that node.

Figure 8:
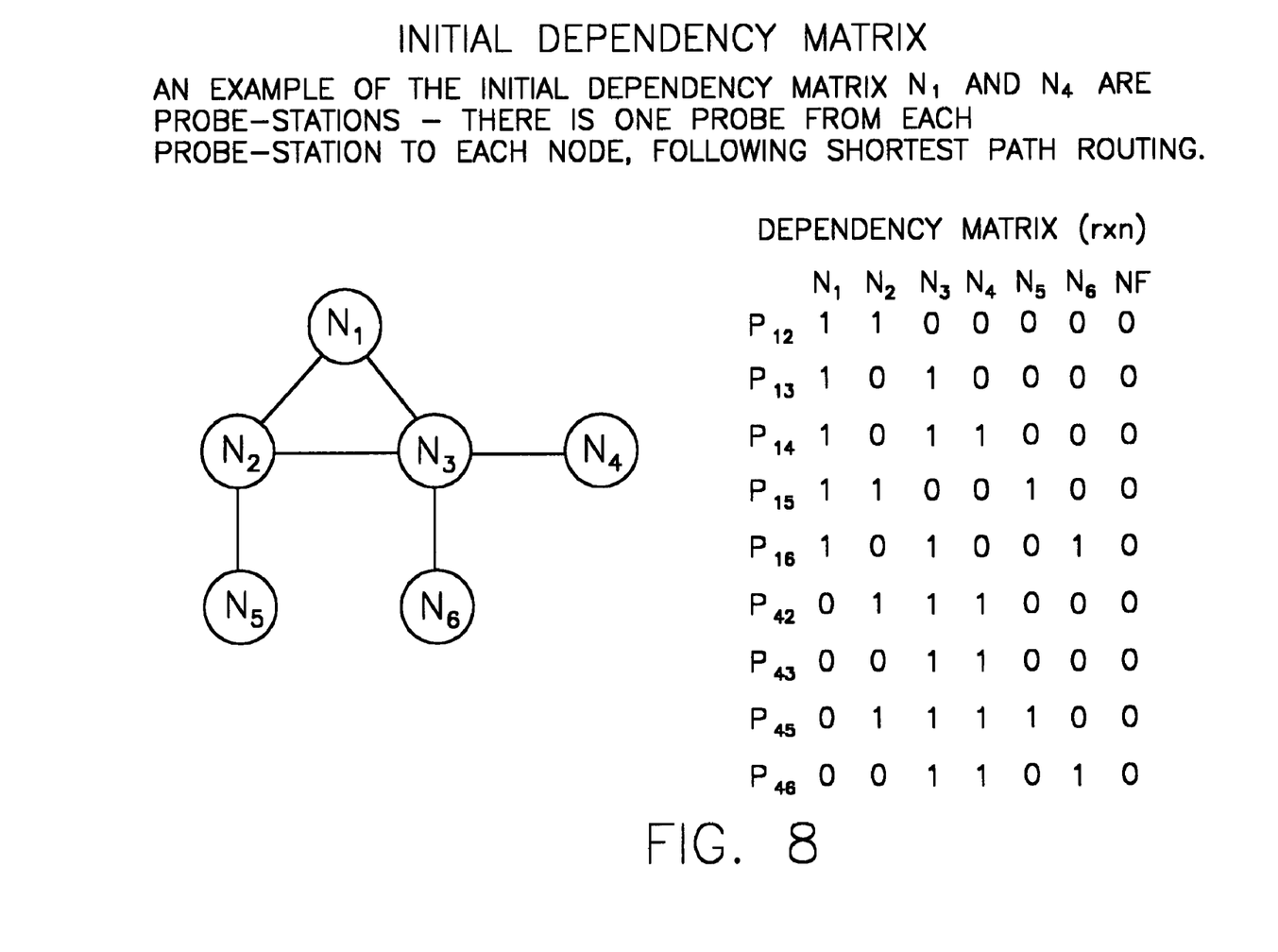
FIG. 8 provides a worked example of this algorithm.

FIG. 8 gives an example of the output of this algorithm for the network shown there. There are 2 probe-stations, $N_1$ and $N_4$, and one probe from each probe-station to each node, following shortest path routing.

Determining the Diagnosable Problems of a Set of Probes

Given a dependency matrix, the decomposition into diagnosable problems places all problems with the same column into the same group. The decomposition is incrementally computed row-by-row. The key is that adding a row (i.e., a probe) always results in a more extensive decomposition, because nodes in distinct groups remain distinguishable; an additional probe can only have the effect of distinguishing previously indistinguishable nodes.

Figure 9:
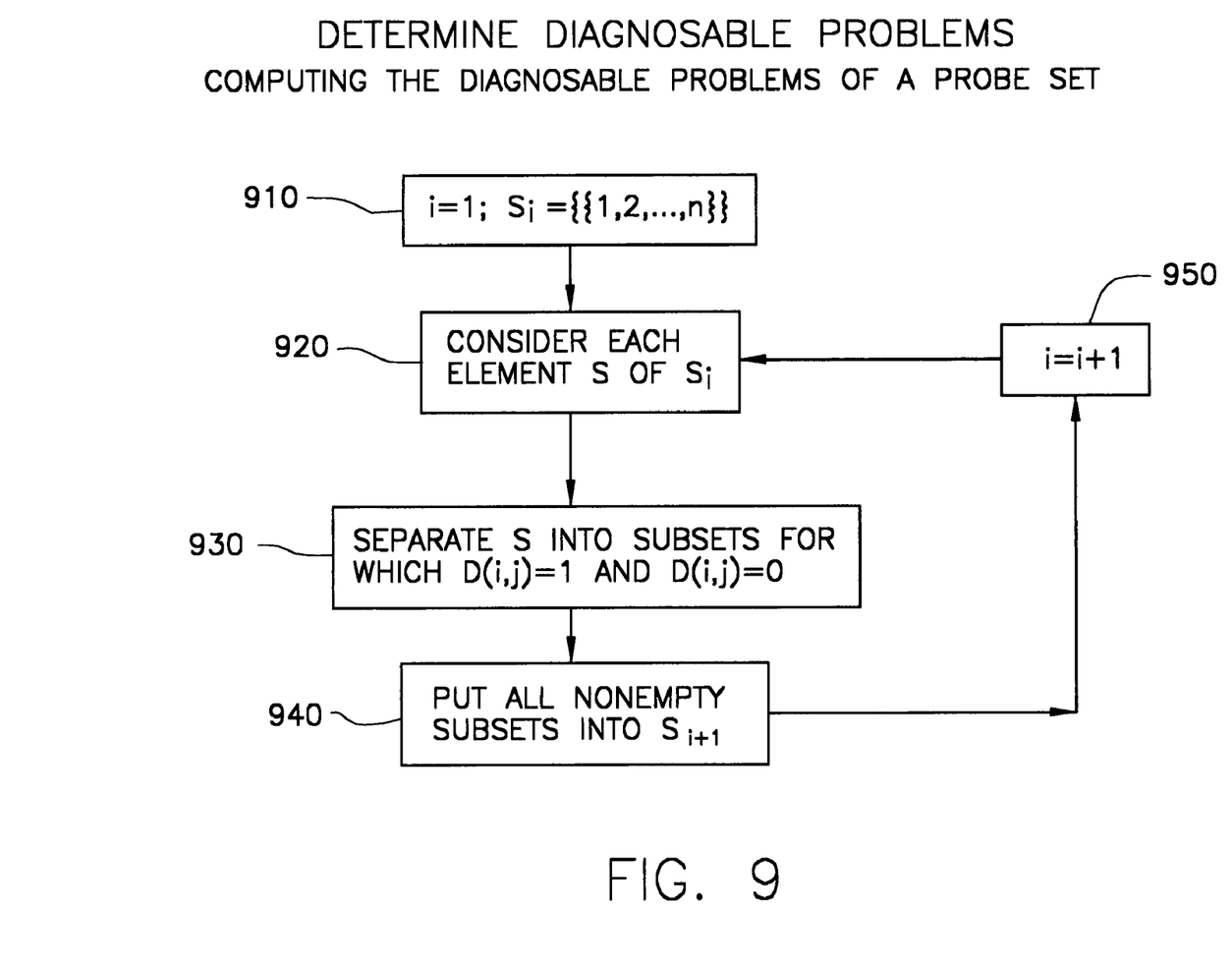
FIG. 9 shows the algorithm for computing the diagnosable problems.

FIG. 9 shows the algorithm for computing the diagnosable problems from a given dependency matrix. The algorithm starts with the decomposition {1,2, . . . , n}—all nodes are indistinguishable, 910. Each additional probe decomposes every group of the current decomposition, 920, into two subgroups depending on which nodes the probe passes through, 930, and all the nonempty subgroups are collected together, 940. This process is repeated for each probe, 950. Thus each of the nodes remains grouped with precisely those nodes it has not yet been distinguished from. The algorithm terminates with the complete decomposition after considering each probe only once.

Figure 10:
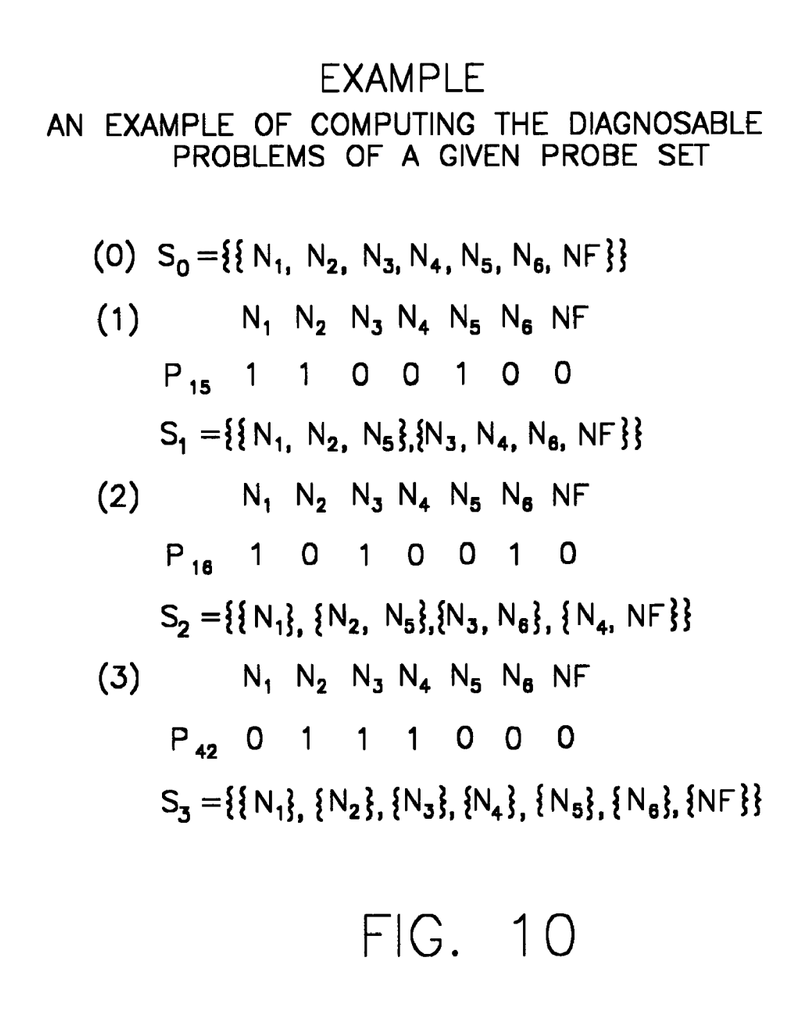
FIG. 10 provides a worked example for this algorithm.

FIG. 10 illustrates how the diagnosable problem algorithm works for the set of 3 probes shown previously in FIG. 5.

Finding the Minimal Set of Probes

The disclosure now turns to a discussion of finding the minimal set of probes that has the same diagnostic power as a given set. For example, the 3 probes shown in FIG. 5 is the smallest subset of the full set of candidate probes shown in FIG. 8 that is able to diagnose any single node failure. Clearly the minimal set of probes may not be unique, although the minimal number of probes is. Three algorithms for finding the minimal probe set are now examined: an exponential time exhaustive search and two approximation algorithms—one requiring linear time and the other quadratic time.

Figure 11:
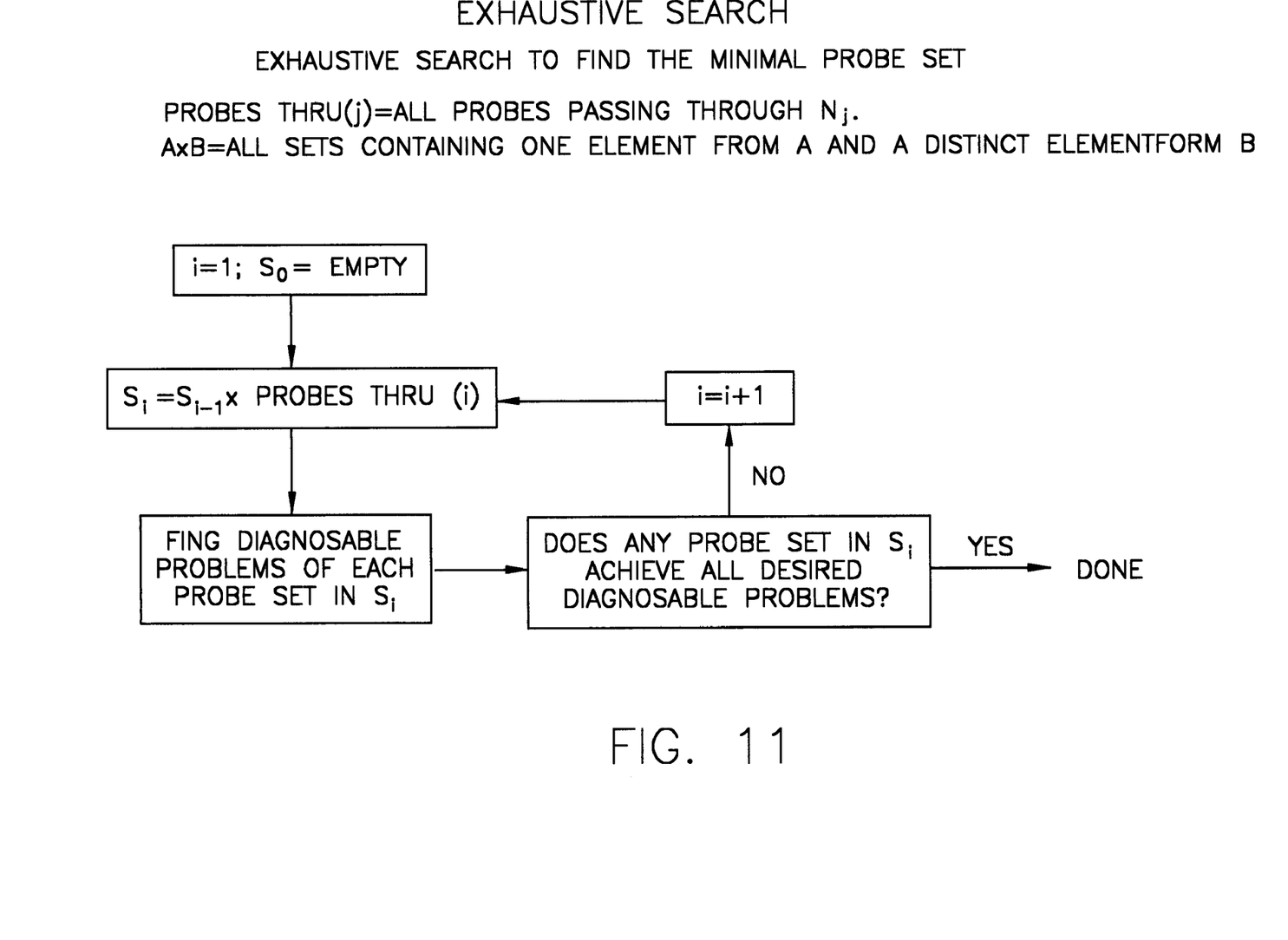
FIG. 11 provides an Exhaustive Search algorithm for finding the minimal probe set.

FIG. 11 provides an Exhaustive Search algorithm for finding the minimal probe set. Since a node can only be diagnosed if there is at least one probe passing through it, probes can be added incrementally in all feasible combinations until the minimal set is reached. The computational complexity of this algorithm increases exponentially as the number of candidate probes increases—this is clearly prohibitive unless the network is quite small.

Two approximation algorithms that heuristically attempt to find the minimum set, but are not guaranteed to do so, are now presented.

Figure 12:
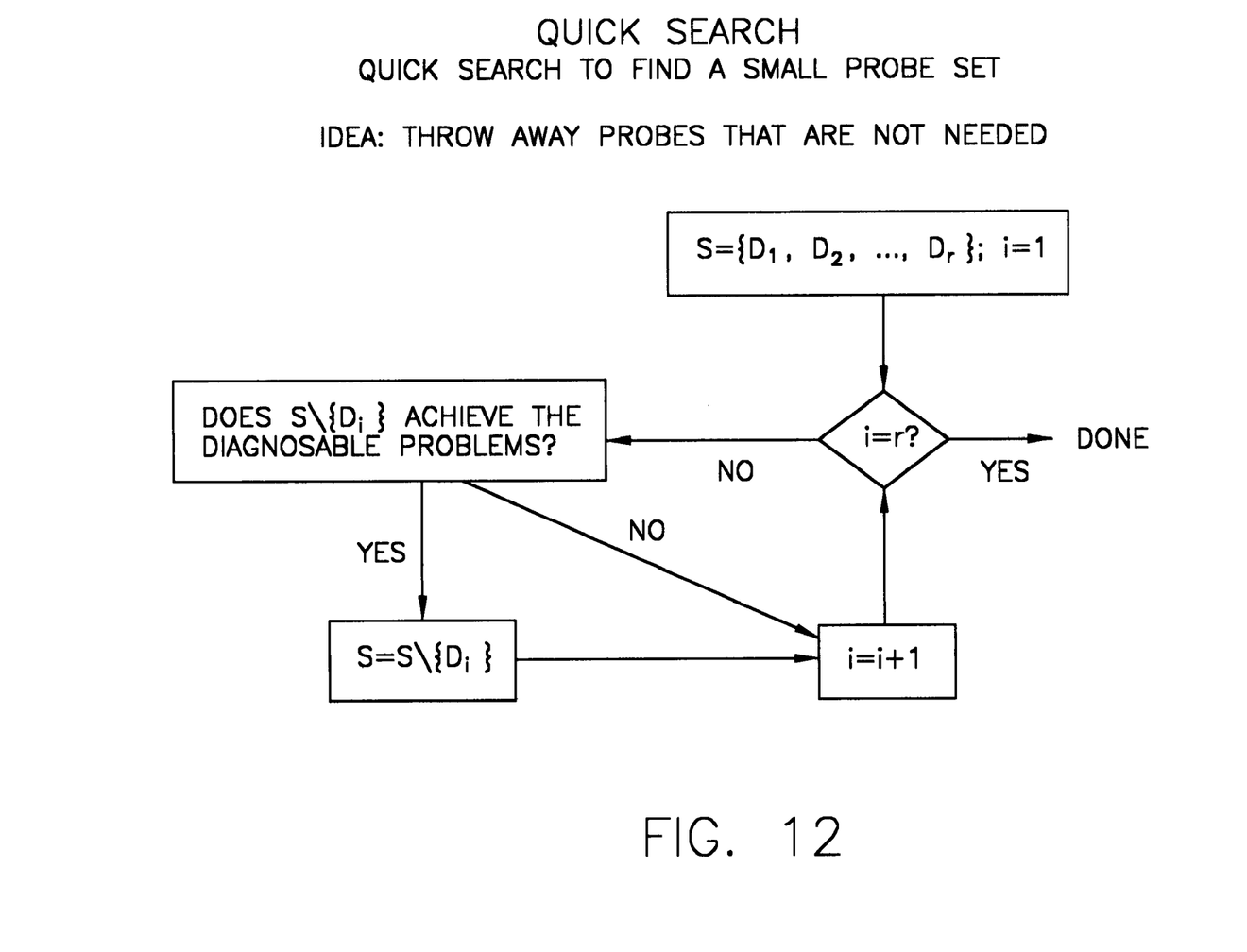
FIG. 12 presents a Quick Search algorithm for finding a small (not necessarily minimal) probe set.

FIG. 12 presents Quick Search—starting with the initial set of r probes, consider each probe in turn and discard it if it is not needed; i.e., a probe is discarded if the diagnosable problems remain the same even if it is dropped from the probe set. This process terminates in a subset with the same diagnostic power as the original set, but this subset may not necessarily be minimal. The complexity of this algorithm increases linearly in the size of the original probe set.

Figure 13:
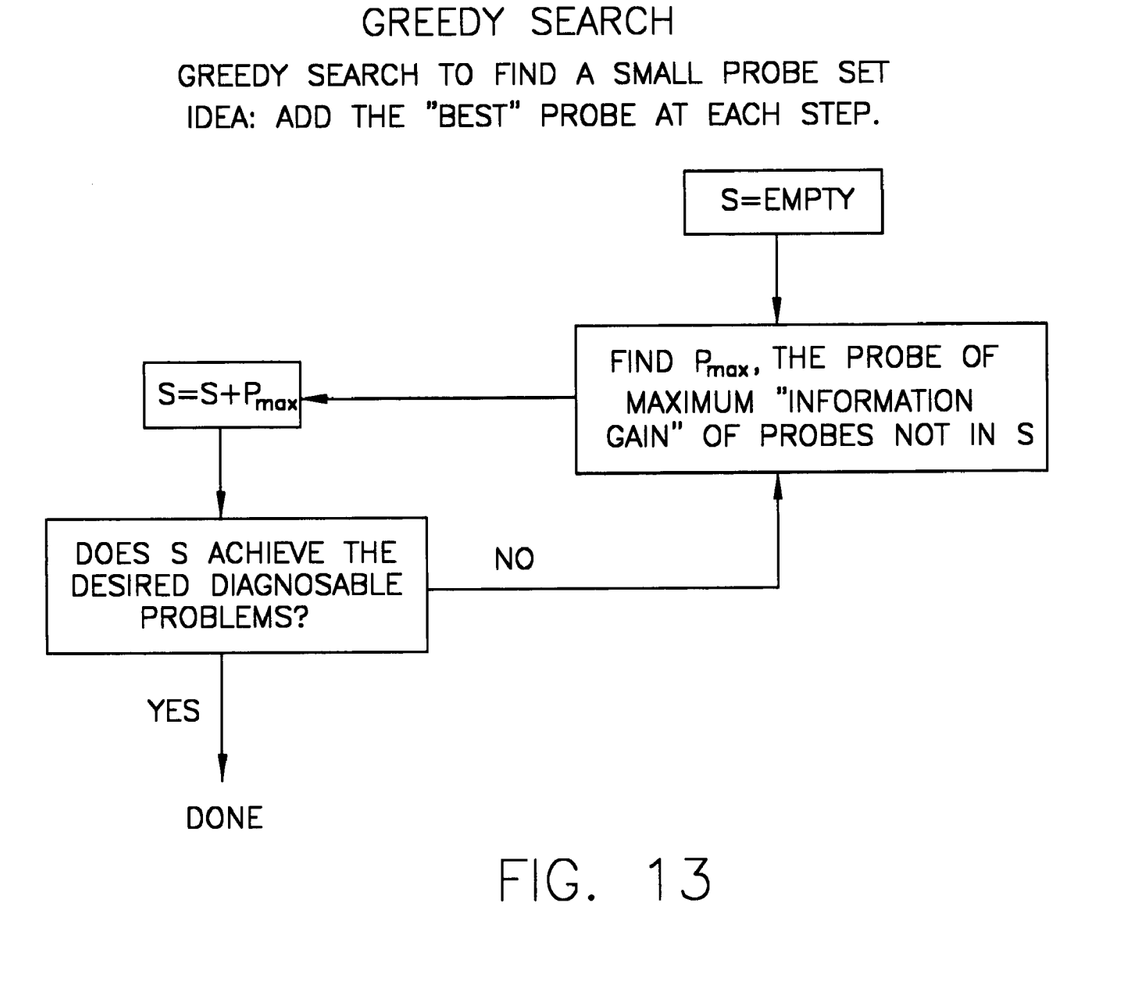
FIG. 13 presents a Greedy Search algorithm for finding a smaller (but also not necessarily minimal) probe set

FIG. 13 presents Greedy Search—starting with an empty set of probes, at each step add what looks like the "best" probe among the remaining probes. This process terminates in a subset with the same diagnostic power as the original set, but this subset may not necessarily be minimal. The complexity of this algorithm increases quadratically in the size of the original probe set. Greedy Search usually finds a smaller subset than Quick Search, but takes a little longer in computation time. For large networks the probe sets found by these algorithms are quite close to the true minimal probe set.

It is to be understood that the present invention, in accordance with at least one presently preferred embodiment, includes an arrangement for determining the candidate probe set, an arrangement for determining which problems can be diagnosed by the candidate probe set, and an arrangement for finding small probe sets which can diagnose the same problems as the candidate probe set, all of which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

LIST OF REFERENCES

[1] A. Frenkiel and H. Lee. EPP: A Framework for Measuring the End-to-End Performance of Distributed Applications. Proceedings of Performance Engineering 'Best Practices' Conference, IBM Academy of Technology, 1999.

[2] "Using Keynote Measurements to Evaluate Content Delivery Networks", available at [http://]www.keynote-.com/services/html/product_lib.html

[3] I. Katzela and M. Schwartz. Fault Identification Schemes in Communication Networks, IEEE/ACM Transactions on Networking, 1995.

[4] S. Kliger, S. Yemini, Y. Yemini, D. Ohsie, S. Stolfo. A Coding Approach to Event Correlation, IM 1997.

[5] B. Gruschke. Integrated Event Management: Event Correlation Using Dependency Graphs, DSOM 1998.

[6] C. S. Hood and C. Ji. Proactive network fault detection. Proceedings of INFOCOM, 1997.

[7] Patent: U.S. Pat. No. 05,528,516—Apparatus and method for event correlation and problem reporting. Date Issued: Jun. 18, 1996

[8] Patent: U.S. Pat. No. 05,661,688—Apparatus and method for analyzing and correlating events in a system using a causality matrix. Date Issued: Aug. 26, 1997

What is claimed is:

1. An apparatus for diagnosing problems in multiple node networks using probing technology, the apparatus comprising:
 an arrangement for determining a candidate probe set;
 an arrangement for determining which problems can be diagnosed by the candidate probe set;
 an arrangement for finding small probe sets which can diagnose the same problems as the candidate probe set; and
 an arrangement for diagnosing problems in the multiple node network based upon a success or failure of probes in the small probe sets.

2. The apparatus according to claim 1, wherein the candidate probe set is determined by considering the routes that a probe can traverse through the network from at least one node to at least one other node in the network.

3. The apparatus according to claim 2, wherein the candidate probe set is determined by using a dependency matrix which has as many rows as the number of probes and as many columns as the number of nodes and each matrix entiy is either 1 or 0 depending an whether or not the probe passes through that node.

4. The apparatus according to claim 3, wherein which problems can be diagnosed by the candidate probe are determined by traversing the dependency matrix row-by-row and grouping nodes together if a fault in any one of them cannot be distinguished by a fault in another node in the group.

5. The apparatus according to claim 4, wherein the faults cannot be distinguished by determining if their corresponding columns in the dependency matrix are identical.

6. The apparatus according to claim 5, wherein the small probe sets which can diagnose the same problems as the candidate probe set are found using a search selected from the group consisting of exhaustive search, quick search, and greedy search.

7. The apparatus according to claim 6, wherein the exhaustive search considers in order of increasing size all possible combinations of probes such that each node has at least one probe passing through it until a set is found that can diagnose the same problems as the candidate set.

8. The apparatus according to claim 6, wherein the quick search traverses the candidate probe set row-by-row and removes probes that are not needed to diagnose the same problems as the candidate set.

9. The apparatus according to claim 6, wherein at each step of the greedy search what is believed to be the "most informative" of the remaining probes is added to the current probe set until the probe set diagnoses the same problems as the candidate set.

10. A method for diagnosing problems in multiple node networks using probing technology, the method comprising the steps of:
 determining a candidate probe set;
 determining which problems can be diagnosed by the candidate probe set;
 finding small probe sets which can diagnose the same problems as the candidate probe set; and
 diagnosing problems in the multiple node network based upon a success or failure of probes in the small probe sets.

11. The method according to claim 10, wherein the candidate probe set is determined by considering the routes that a probe can traverse through the network from at least one node to at least one other node in the network.

12. The method according to claim 11, wherein the candidate probe set is determined by using a dependency matrix which has as many rows as the number of probes and as many columns as the number of nodes and each matrix entry is either 1 or 0 depending on whether or not the probe passes through that node.

13. The method according to claim 12, wherein which problems can be diagnosed by the candidate probe are determined by traversing the dependency matrix row-by-row and grouping nodes together if a fault in any one of them cannot be distinguished by a fault in another node in the group.

14. The method according to claim 13, wherein the faults cannot be distinguished by determining if their corresponding columns in the dependency matrix are identical.

15. The method according to claim 14, wherein the small probe sets which can diagnose the same problems as the candidate probe set are found using a search selected from the group consisting of exhaustive search, quick search, and greedy search.

16. The method according to claim 15, wherein the exhaustive search considers in order of increasing size all possible combinations of probes such that each node has at least one probe passing through it until a set is found that can diagnose the same problems as the candidate set.

17. The method according to claim 15, wherein the quick search traverses the candidate probe set row-by-row and removes probes that are not needed to diagnose the same problems as the candidate set.

18. The method according to claim 15, wherein at each step of the greedy search what is believed to be the "most informative" of the remaining probes is added to the current probe set until the probe set diagnoses the same problems as the candidate set.

19. A program storage device readable by machine, tangibly embodying a program of instructions executable by the machine to perform method steps for diagnosing problems in multiple node networks using probing technology, said method comprising the steps of:
 determining a candidate probe set;
 determining which problems can be diagnosed by the candidate probe set;
 finding small probe sets which can diagnose the same problems as the candidate probe set; and
 diagnosing problems in the multiple node network based upon a success or failure of probes in the small probe sets.

* * * * *

UNITED STATES PATENT AND TRADEMARK OFFICE
CERTIFICATE OF CORRECTION

| | | |
|---|---|---|
| PATENT NO. | : 7,167,998 B2 | Page 1 of 1 |
| APPLICATION NO. | : 10/676244 | |
| DATED | : January 23, 2007 | |
| INVENTOR(S) | : Brodie et al. | |

It is certified that error appears in the above-identified patent and that said Letters Patent is hereby corrected as shown below:

Column 7, Line 29, "entiy" should be --entry--

Column 7, Line 29, "an" should be --on--

Signed and Sealed this

Eighth Day of May, 2007

JON W. DUDAS
*Director of the United States Patent and Trademark Office*